(12) United States Patent
Noh et al.

(10) Patent No.: US 8,488,544 B2
(45) Date of Patent: Jul. 16, 2013

(54) COMMUNICATION SYSTEM USING CARRIER AGGREGATION, AND BASE STATION AND TERMINAL INCLUDED IN THE COMMUNICATION SYSTEM

(75) Inventors: Taegyun Noh, Daejeon (KR); Kyoung Seok Lee, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 238 days.

(21) Appl. No.: 13/058,689

(22) PCT Filed: Aug. 13, 2009

(86) PCT No.: PCT/KR2009/004532
§ 371 (c)(1),
(2), (4) Date: Feb. 11, 2011

(87) PCT Pub. No.: WO2010/019009
PCT Pub. Date: Feb. 18, 2010

(65) Prior Publication Data
US 2011/0134877 A1    Jun. 9, 2011

(30) Foreign Application Priority Data

Aug. 13, 2008  (KR) .................... 10-2008-0079281
Sep. 22, 2008  (KR) .................... 10-2008-0092658
Jul. 27, 2009  (KR) .................... 10-2009-0068227

(51) Int. Cl.
*H04W 4/00* (2009.01)

(52) U.S. Cl.
USPC ........................................... 370/329

(58) Field of Classification Search
None
See application file for complete search history.

(56) References Cited

U.S. PATENT DOCUMENTS

| | | | |
|---|---|---|---|
| 8,194,601 B2* | 6/2012 | Han et al. | 370/329 |
| 2010/0296473 A1* | 11/2010 | Kim et al. | 370/329 |
| 2011/0128942 A1* | 6/2011 | Kim et al. | 370/336 |
| 2011/0134868 A1* | 6/2011 | Lee et al. | 370/329 |
| 2011/0142000 A1* | 6/2011 | Han et al. | 370/329 |
| 2011/0194514 A1* | 8/2011 | Lee et al. | 370/329 |
| 2011/0211541 A1* | 9/2011 | Yuk et al. | 370/329 |
| 2012/0300733 A1* | 11/2012 | Pelletier et al. | 370/329 |

FOREIGN PATENT DOCUMENTS

| | | |
|---|---|---|
| KR | 1020040014332 | 2/2004 |
| KR | 1020040025482 | 3/2004 |
| KR | 1020060060452 | 6/2006 |
| KR | 1020070053803 | 5/2007 |

* cited by examiner

*Primary Examiner* — Clemence Han
(74) *Attorney, Agent, or Firm* — Nelson Mullins Riley & Scarborough LLP; EuiHoon Lee, Esq.

(57) ABSTRACT

A type 1 system and a type 2 system are classified according to whether carrier aggregation is used. A shared component carrier is used for both a type 1 terminal and a type 2 terminal, whereas a dedicated component carrier is used only for the type 2 terminal. Also, a type 2 base station transmits broadcast information by using a shared component carrier. In this instance, the broadcast information includes the shared broadcast information used for both the type 1 terminal and the type 2 terminal and the dedicated broadcast information only for the type 2 terminal. Also, the type 2 base station indicates component carriers that are used by the type 2 terminal, by using a semi-static component carrier indicator or a dynamic component carrier indicator.

22 Claims, 4 Drawing Sheets

TYPE 1 SYSTEM

TYPE 2 SYSTEM

TYPE 1 TERMINAL    TYPE 2 TERMINAL

ONE-TO-ONE MAPPING

US 8,488,544 B2

COMMUNICATION SYSTEM USING CARRIER AGGREGATION, AND BASE STATION AND TERMINAL INCLUDED IN THE COMMUNICATION SYSTEM

RELATED APPLICATIONS

This application is a 35 U.S.C. §371 national stage filing of PCT Application No. PCT/KR2009/004532 filed on Aug. 13, 2009, which claims priority to, and the benefit of, Korean Patent Application No. 10-2008-0079281 filed Aug. 13, 2008; Korean Patent Application No. 10-2008-0092658 filed Sep. 22, 2008 and Korean Patent Application No. 10-2009-0068227 filed Jul. 27, 2009. The contents of the aforementioned applications are hereby incorporated by reference.

TECHNICAL FIELD

The present invention relates to a communication system that uses carrier aggregation.

BACKGROUND ART

There are various approaches to improve data transmission rate in a wireless communication system. As an example, technologies for improving data transmission rate by applying a high order modulation or increasing a number of transmission/reception antennas and a frequency bandwidth have been recently developed. Particularly, increasing of the frequency bandwidth may efficiently increase the data transmission rate.

Examples of the method for increasing the frequency bandwidth may include a method of obtaining a new frequency bandwidth having a broad bandwidth or a method of logically combining frequency bandwidths having a narrow bandwidth. Regardless of how the frequency bandwidth increases, the obtained frequency bandwidth may be used in roughly two ways.

One way is newly designing of a physical channel, a transmit channel, a logical channel, and the like that are optimal to the obtained frequency bandwidth, to use the obtained frequency bandwidth. Another way is maintaining of a physical channel, a transmit channel, and a logical channel that are designed for component frequency bandwidths constituting the obtained frequency bandwidth, to use the obtained frequency bandwidth. This other way is referred to as carrier aggregation.

There are terminals being capable of using an entire obtained frequency bandwidth and terminals being incapable of using the entire obtained frequency bandwidth but using only each of component frequency bandwidths constituting the obtained frequency bandwidth, and thus, the communication system that uses the carrier aggregation may need to provide a high compatibility.

DISCLOSURE OF INVENTION

Technical Problem

An aspect of the present invention provides a communication system that uses carrier aggregation, which provides a high compatibility, thereby serving conventional terminals for a communication system that does not use the carrier aggregation.

Another aspect of the present invention classifies component carriers as a shared component carrier and a dedicated component carrier, thereby supporting conventional terminals and new terminals.

Another aspect of the present invention transmits broadcast information including shared broadcast information and dedicated broadcast information by using a shared component carrier, thereby effectively serving conventional terminals and new terminals.

Another aspect of the present invention enables terminals to effectively identify used component carriers by using a component carrier indicator.

Solution to Problem

According to an aspect of an exemplary embodiment, there is provided an operational method for a base station of a communication system that uses carrier aggregation, the method including designating a frequency band that is used for a type 1 terminal and a type 2 terminal as a downlink shared component carrier and an uplink shared component carrier, and designating at least one frequency band that is used for the type 2 terminal as at least one downlink dedicated component carrier and at least one uplink dedicated component carrier.

Here, the downlink shared component carrier and the uplink shared component carrier are used for transmitting/receiving a control signal, a reference signal, and physical data corresponding to the type 1 terminal and the type 2 terminal, and the at least one downlink dedicated component carrier and the at least one uplink dedicated component carrier are used for transmitting/receiving a control signal, a reference signal, and physical data corresponding to the type 2 terminal. Also, the downlink shared component carrier and the uplink shared component carrier are mapped together according to a mapping function, and the at least one downlink dedicated component carrier and the at least one uplink dedicated component carrier are mapped together according to the mapping function.

Also, the operational method for the base station may further include assigning indexes to the downlink shared component carrier, the uplink shared component carrier, the at least one downlink dedicated component carrier, and the at least one uplink dedicated component carrier. Here, the indexes are used by the type 1 terminal and the type 2 terminal for identifying either a mapping relation between the downlink shared component carrier and the uplink shared carrier or a mapping relation between the at least one downlink dedicated component carrier and the at least one uplink dedicated component carrier.

In this instance, a frequency of the downlink shared component carrier and a frequency of the uplink shared component carrier may be lower than a frequency of the at least one downlink dedicated component carrier and a frequency of the at least one uplink dedicated component carrier.

Also, the operational method for the base station may further include adaptively selecting at least one of the downlink shared component carrier, the uplink shared component carrier, the at least one downlink dedicated component carrier, and the at least one uplink dedicated component carrier, and using the selected at least one carrier for the type 2 terminal.

Also, the operational method for the base station may further include transmitting broadcast information by using the at least one downlink shared component carrier.

Here, the broadcast information includes shared broadcast information for the type 1 terminal and the type 2 terminal, and the broadcast information includes dedicated broadcast information for the type 2 terminal. Particularly, each of the shared broadcast information and the dedicated broadcast information is identified according to a unique identifier, and the unique identifier is masked on a cyclic redundancy check (CRC) code of information indicating the broadcast information. Also, the identifier may be a Radio Network Temporary Identifier (RNTI). Also, the shared broadcast information includes information related to the downlink shared component carrier and the uplink shared component carrier, and the dedicated broadcast information includes information related to the downlink shared component carrier, the uplink shared component carrier, the at least one downlink dedicated component carrier, and the at least one uplink dedicated component carrier. Also, the shared broadcast information includes either a pair of information related to the downlink shared component carrier and information related to the uplink shared component carrier or a pair of information related to the at least one downlink dedicated component carrier and information related to the at least one uplink dedicated component carrier.

The information related to the downlink shared component carrier and the uplink shared component carrier includes information related to bandwidths and locations of the downlink shared component carrier and the uplink shared component carrier, and the information related to the downlink shared component carrier, the uplink shared component carrier, the at least one downlink dedicated component carrier, and the at least one uplink dedicated component carrier includes bandwidths and locations of the downlink shared component carrier, the uplink shared component carrier, the at least one downlink dedicated component carrier, and the at least one uplink dedicated component carrier.

Also, the operational method for the base station may further include transmitting at least one of a semi-static component carrier indicator and a dynamic component carrier indicator for indicating component carriers that are used by the base station and the type 2 terminal.

In this instance, the type 2 terminal searches for a predetermined number of component carriers indicated by the semi-static component carrier indicator and identifies corresponding resource assignment information.

In this instance, the type 2 terminal searches for at least one predetermined assignment component carrier, identifies the dynamic component carrier indicator, and identifies a component carrier related to corresponding resource assignment information based on the identified dynamic component carrier indicator.

According to another aspect of an exemplary embodiment, there is provided a base station of a communication system that uses carrier aggregation, the base station including a shared component carrier designation unit to designate a frequency bandwidth that is used for a type 1 terminal and a type 2 terminal as a downlink shared component carrier and an uplink shared component carrier, a dedicated component carrier designation unit to designate at least one frequency bandwidth that is used for the type 2 terminal as at least one downlink dedicated component carrier and at least one uplink dedicated component carrier, a broadcast information transmitting unit to transmit the shared broadcast information for the type 1 terminal and the type 2 terminal and the dedicated broadcast information for the type 2 terminal, by using the at least one downlink shared component carrier, and a component carrier indicator transmitting unit to transmit a dynamic component carrier indicator or a semi-static component carrier indicator for indicating component carriers that are used by the type 2 terminal and the base station.

Also, an operational method of a type 2 terminal of a communication system that uses carrier aggregation, the method includes receiving broadcast information transmitted through the at least one downlink shared component carrier, the broadcast information including shared broadcast information for the type 1 terminal and the type 2 terminal and dedicated information for the type 2 terminal, extracting each of the shared broadcast information and the dedicated broadcast information according to unique identifier, and receiving a dynamic component carrier identifier or a semi-static component carrier identifier for identifying component carriers that are used by the base station and the type 2 terminal, wherein a frequency bandwidth that is used for a type 1 terminal and a type 2 terminal is designated as downlink shared component carrier and uplink shared component carrier, and at least one frequency bandwidth that is used for the type 2 terminal is designated as at least one downlink dedicated component carrier and at least one uplink dedicated component carrier. The method further includes at least one of searching for a predetermined number of component carriers based on the component carrier indicator to identify corresponding resource assignment information; and searching for a predetermined assignment component carrier to identify the dynamic component carrier indicator and the corresponding resource assignment information and identifying a component carrier related to the corresponding resource assignment information based on the identified dynamic component carrier indicator.

The present invention provides a communication system that uses carrier aggregation, which provides a high compatibility, thereby serving conventional terminals for a communication system that does not use the carrier aggregation.

The present invention classifies component carriers as a shared component carrier and a dedicated component carrier, thereby supporting conventional terminals and new terminals.

The present invention transmits broadcast information including shared broadcast information and dedicated broadcast information by using a shared component carrier, thereby effectively serving conventional terminals and new terminals.

The present invention enables terminals to effectively identify used component carriers by using a component carrier indicator.

MODE FOR THE INVENTION

Figure 1:
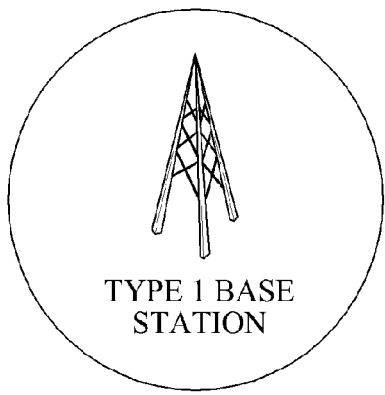
FIG. 1 illustrates a type 1 terminal, a type 1 base station, a type 2 terminal, and a type 2 base station according to embodiments of the present invention.
Figure 1:
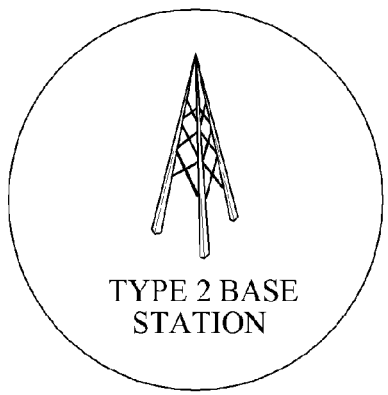
Figure 1:
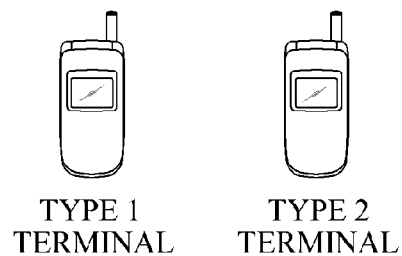

Reference will now be made in detail to embodiments of the present invention, examples of which are illustrated in the accompanying drawings, wherein like reference numerals refer to the like elements throughout. The embodiments are described below in order to explain the present invention by referring to the figures.

A base station is a control device to control a single cell. In a real communication system, a physical base station may control a plurality of cells. In this instance, the physical base station may be regarded as a set of base stations of the present invention.

FIG. 1 illustrates a type 1 terminal, a type 1 base station, a type 2 terminal, and a type 2 base station according to embodiments of the present invention.

Referring to FIG. 1, a type 1 system is a system that does not utilize carrier aggregation, and a type 2 system is a system that utilizes the carrier aggregation. That is, in the type 1 system, the type 1 base station and the type 1 terminal use a single component carrier in each of an uplink and a downlink, whereas in the type 2 system that uses the carrier aggregation, the type 2 base station and the type 2 terminal use at least one component carrier in each of an uplink and a downlink.

Also, the type 1 terminal even uses a single component carrier in each of an uplink and a downlink of the type 2 system as well as in each of an uplink and a downlink of the type 1 system. Conversely, the type 2 terminal uses a single component carrier in each of an uplink and a downlink of the type 1 system, and uses at least one component carrier in each of the uplink and downlink of the type 2 system.

When the type 2 system requires various changes from the type 1 terminal to support the type 1 terminal, there may be difficulty in equipping the type 2 system economically and realistically. Accordingly, to increase compatibility of the type 2 system, the type 2 system may need to effectively support both the type 1 terminal and the type 2 terminal.

Figure 2:
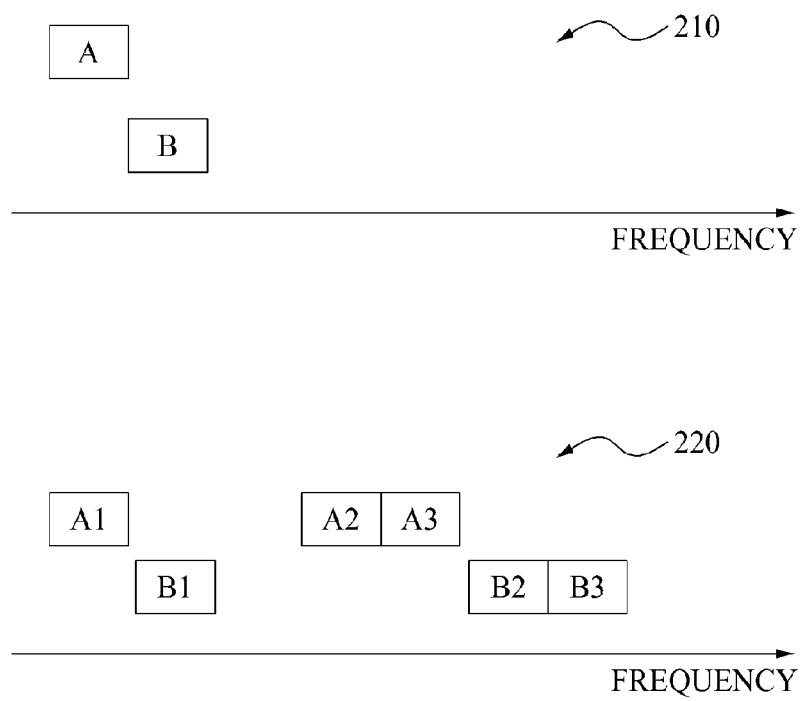
FIG. 2 illustrates an example that a type 1 system uses component carriers and an example that a type 2 system uses carrier aggregation.

FIG. 2 illustrates an example that a type 1 system uses component carriers and an example that a type 2 system uses carrier aggregation.

Referring to FIG. 2, a graph 210 indicates component carriers used in the type 1 system. A component carrier A is an 'uplink component carrier' used in an uplink of the type 1 system, and a component carrier B is a 'downlink component carrier' used in a downlink of the type 1 system. That is, referring to the graph 210, when a type 1 terminal and a type 2 terminal access the type 1 system, the type 1 terminal and the type 2 terminal use a single component carrier in each of the uplink and the downlink.

Also, a graph 220 indicates component carriers used in the type 2 system that uses carrier aggregation. The component carriers A1, A2, and A3 are uplink component carriers, and component carriers B1, B2, and B3 are downlink component carriers. In this instance, the uplink component carriers A1, A2, and A3 respectively correspond to the down link component carriers B1, B2, and B3.

When the type 1 terminal accesses the type 2 system, the type 2 system assigns one of the component carriers to the type 1 terminal in each of the uplink and the downlink. Also, when the type 2 terminal accesses the type 2 system, the type 2 system assigns at least one component carrier to the type 2 terminal in each of the uplink and the downlink.

Figure 3:
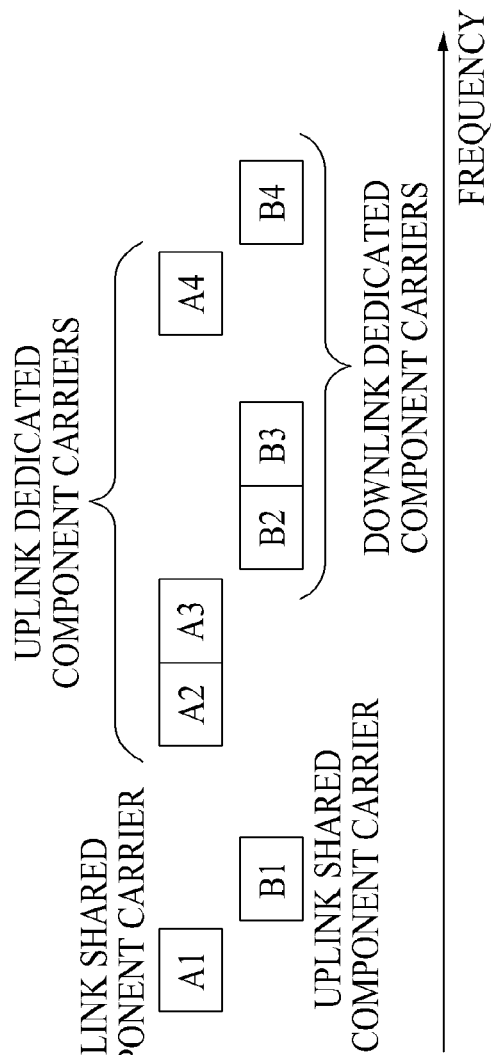
FIG. 3 illustrates shared component carriers and dedicated component carriers according to an embodiment of the present invention.

FIG. 3 illustrates shared component carriers and dedicated component carriers according to an embodiment of the present invention.

Referring to FIG. 3, a type 2 system classifies a plurality of component carriers obtained by carrier aggregation into shared component carriers and dedicated component carriers.

In FIG. 3, a component carrier A1 is an uplink shared component carrier, a component carrier B1 is a downlink shared component carrier. Also, component carriers A2, A3, and A4 are uplink dedicated component carriers, and component carriers B2, B3, and B4 are downlink dedicated component carriers. Here, the component carriers A1 and B1 are shared component carriers, and component carriers A2, A3, A4, B2, B3, and B4 are dedicated component carriers. A synchronous signal that both the type 1 terminal and the type 2 terminal may receive may be transmitted through the shared component carrier, whereas the synchronous signal may not be transmitted through the downlink dedicated component carrier and only a synchronous signal that the type 2 terminal may only receive may be transmitted through the downlink dedicated component carrier. In this instance, the synchronous signal transmitted through the shared component carrier is different from the synchronous signal transmitted through the dedicated component carrier.

The type 1 terminal and the type 2 terminal may transmit/receive corresponding physical data, a control signal, a reference signal, and the like by using shared component carriers. However, the type 1 terminal may not use the dedicated component carriers, and the type 2 terminal may only transmit/receive corresponding physical data, a reference signal, a control signal, and the like through the dedicated component carriers. Accordingly, when the type 1 terminal accesses the type 2 system, a type 2 base station serves the type 1 terminal by using the shared component carriers, and when the type 2 terminal accesses the type 2 system, the type 2 base station may serve the type 2 terminal by using the shared component carriers and the dedicated component carriers. A type 1 base station and the type 1 terminal may perform transmission/reception of physical data, a reference signal, a control signal, and the like in the type 1 system through a signal uplink and downlink component carrier, whereas the type 2 base station may perform transmission/reception of physical data, a reference signal, a control signal, and the like with the type 1 terminal and the type 2 terminal through the shared component carrier in the type 2 system. Therefore, according to the present invention, the type 1 terminal operated in the type 1 system may operate in the type 2 system in the same manner, and thus, carrier aggregation is used to effectively serve the type 2 terminal, without changing hardware and software of the type 1 terminal.

Also, indexes may be assigned to component carriers including the shared component carriers and the dedicated component carriers. Also, the assigned indexes may be explicitly and implicitly shared between the type 2 base station and the type 1 terminal or between the type 2 base station and the type 2 terminal. There are a variety of methods for assigning indexes to the component carriers. As an example, small indexes are assigned to component carriers having a physically low frequency, whereas large indexes are assigned to component carriers having a physically high frequency.

Also, the uplink component carriers, namely, the uplink shared component carrier and the uplink dedicated component carriers, and the downlink component carriers, namely, the downlink shared component carrier and the downlink dedicated component carriers, are mapped to each other according to various mapping functions. As an example, the uplink component carriers and the downlink component carriers may be mapped to each other according to the mapping functions, such as one-to-one, one-to-many, many-to-one, and many-to-many. In this instance, the indexes of the component carriers may be used as an input variable or an output variable of the mapping function.

Figure 4:
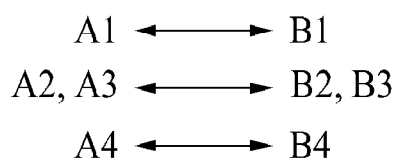
FIG. 4 illustrates an example of a mapping relation between downlink component carriers and uplink component carriers.

FIG. 4 illustrates an example of a mapping relation between downlink component carriers and uplink component carriers.

Referring to FIG. 4, the mapping relation between the downlink component carriers and the uplink component carrier is one-to-one. That is, a single uplink shared component carrier A1 corresponds to a single downlink shared component carrier B1, and uplink dedicated component carriers A2, A3, and A4 respectively correspond to downlink dedicated component carriers B2, B3, and B4.

Although FIG. 4 illustrates that the downlink component carriers and the uplink component carriers are mapped in a one-to-one mapping function, various mapping functions may be embodied based on indexes assigned to component carriers.

Referring to FIGS. 3 and 4, it is assumed that a type 2 system is a frequency division duplex (FDD) system, and a single uplink shared component carrier and a single downlink shared component carrier exist. Also, it is assumed that a number of uplink dedicated component carriers is identical to a number of downlink dedicated component carriers, and uplink component carriers and downlink component carriers are mapped according to a one-to-one mapping function. Also, it is assumed that a number of indexes assigned to the component carriers increases as a frequency increases.

In this instance, while a type 1 terminal and a type 2 terminal perform a cell-search with respect to a type 2 base station, the type 1 terminal and the type 2 terminal may ascertain a number of downlink component carriers based on a reference signal and the like transmitted from all downlink component carriers. Also, the type 1 terminal and the type 2 terminal may distinguish a downlink share component carrier from downlink dedicated component carriers based on a synchronous signal and the like, and may identify an index of each of the downlink component carriers.

Also, the type 1 terminal and the type 2 terminal may identify corresponding uplink component carriers based on the index of each of the downlink component carrier and a mapping function, and thus, the type 1 terminal and the type 2 terminal may use the uplink component carriers.

As described above, unlike the type 1 terminal that may only use shared component carriers, the type 2 terminal may use both the shared component carriers and the dedicated component carriers and may transmit corresponding physical data, a reference signal, and a control signal by using both of the shared component carriers and the dedicated component carriers. In this instance, a number of component carriers that the type 2 terminal actually use at the same time may be variable according to a data transmission rate, a channel status, and the like. That is, the type 2 base station may transmit, to at least one downlink component carrier, an uplink grant for a physical data channel, based on a required data transmission rate, a channel status, and the like. The type 1 terminal and the type 2 terminal may receive the uplink grant, and uplink physical data may be transmitted through an uplink component carrier corresponding to the downlink component carrier through which the uplink grant is transmitted, based on the mapping function. The type 2 base station may receive the uplink physical data, and an ACK/NACK indicating whether the uplink physical data is successfully received may be transmitted through the downlink component carrier, through which the uplink grant is transmitted. Also, the type 2 base station may transmit, to at least one downlink component carrier, downlink physical data and a downlink assignment with respect to the downlink physical data based on the required data transmission rate, the channel status, and the like. The type 1 terminal and the type 2 terminal may receive the downlink assignment information and the downlink physical data, and an ACK/NACK indicating whether the downlink physical data is successfully received may be transmitted through an uplink component carrier corresponding to the downlink component carrier through which the downlink assignment information is transmitted.

When broadcast information of the type 2 system is appropriately transmitted to the type 1 terminal and the type 2 terminal, the type 1 terminal and the type 2 terminal may appropriately operate in the type 2 system. In this instance, since the type 1 terminal may only use the shared component carrier, the type 2 base station according to an embodiment of the present invention may transmit the broadcast information by using the shared component carrier. Hereinafter, the broadcast information will be described in detail.

Figure 5:
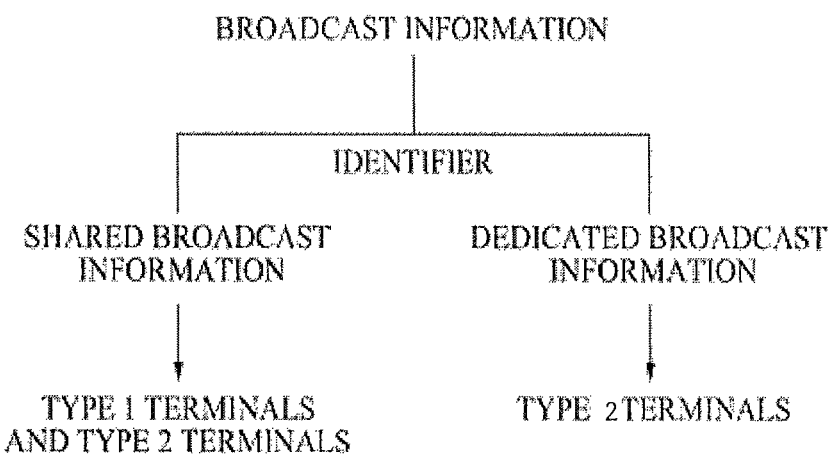
FIG. 5 is a conceptual diagram illustrating broadcast information including shared broadcast information and dedicated broadcast information.

FIG. 5 is a conceptual diagram illustrating broadcast information including shared broadcast information and dedicated broadcast information.

Referring to FIG. 5, broadcast information that is transmitted from a type 2 base station to a type 1 terminal or to a type 2 terminal via a downlink shared component carrier may be classified as shared broadcast information and dedicated broadcast information. Here, the shared broadcast information is used by both the type 1 terminal and the type 2 terminal, whereas the dedicated broadcast information is only used by the type 2 terminal. Also, the shared broadcast information includes information about a corresponding shared component carrier, whereas the dedicated broadcast information includes information about all other component carriers excluding the corresponding shared component carrier. Here, the corresponding shared component carrier is a component carrier that is used for transferring the shared broadcast information.

Each of the shared broadcast information and the dedicated broadcast information is distinguished according to a unique identifier. As an example, a radio network temporary identifier (RNTI) may be assigned to the shared broadcast information and the dedicated broadcast information. Particularly, the unique identifier may be masked on a cyclic redundancy check (CRC) code of information indicating the broadcast information, and may be transferred to the type 1 terminal and the type 2 terminal. In this instance, the type 1 terminal may only receive the shared broadcast information, and may not receive the dedicated broadcast information. However, the type 2 terminal may receive both the shared broadcast information and the dedicated broadcast information.

The broadcast information may include information about component carriers. As an example, the broadcast information includes location information of the component carriers in a frequency domain, such as an E-UTRA Absolute Radio Frequency Channel Number and the like, or include information about bandwidth information.

More particularly, the shared broadcast information may include bandwidth information of the downlink shared component carrier through which the shared broadcast information is transmitted and location information of the downlink shared component carrier in the frequency domain. The dedicated broadcast information may include bandwidth information and location information of the downlink shared component carrier through which the dedicated broadcast information is transmitted and bandwidth information and location information of an uplink shared component carrier corresponding to the downlink shared component carrier.

In this instance, the shared broadcast information or the dedicated broadcast information may be generated with respect to a pair consisting of at least one component carriers, and subsequently may be transmitted. As an example, the bandwidth information and location information of the downlink dedicated component carrier and the bandwidth information and location information of the uplink dedicated component carrier corresponding to the downlink dedicated component carrier may constitute a pair and may be included in the dedicated broadcast information. In this instance, a structure of the dedicated broadcast information may be the bandwidth information of the downlink dedicated component carrier, location information of the downlink dedicated component carrier, bandwidth information of the corresponding uplink dedicated component carrier, and location information of the corresponding uplink dedicated component carrier. According to the present invention, a mapping relation between the uplink component carriers and the downlink components carriers and the bandwidth information of the uplink component carriers and the downlink components carriers may be explicitly transferred.

As a result, the type 1 terminal and the type 2 terminal may obtain the location information of the downlink shared component carrier based on a synchronous signal transmitted through the downlink shared component carrier. Also, the type 1 terminal and the type 2 terminal may identify the bandwidth information of the downlink shared component carrier and the location information and bandwidth information of the corresponding uplink shared component carrier through the shared broadcast information. Additionally, the type 2 terminal may identify location information and bandwidth information of other component carriers based on the dedicated broadcast information.

Figure 6:
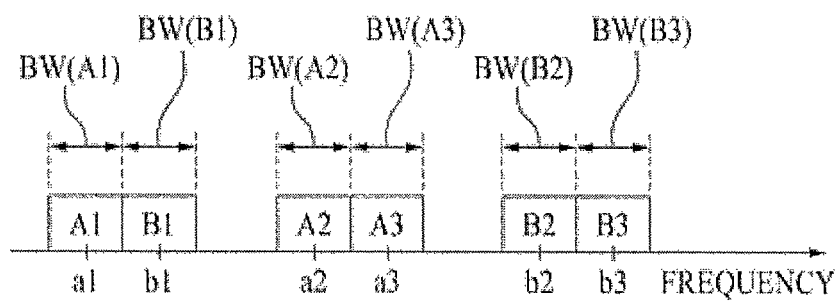
FIG. 6 illustrates elements included in broadcast information.

FIG. 6 illustrates components included in broadcast information.

Referring to FIG. 6, shared broadcast information may be in form of (a1, BW(A1), b1, BW(B1)). Here, a1 is location information of an uplink shared component carrier A1, BW(A1) is bandwidth information of the uplink shared component carrier A1, b1 is location information of a downlink shred component carrier B1, and BW(B1) is bandwidth information of the downlink shared component carrier B1.

Also, an uplink dedicated component carrier A2 corresponds to a downlink dedicated component carrier B2, and an uplink dedicated component carrier A3 corresponds to a downlink dedicated component carrier B3.

In this instance, the dedicated broadcast information may include (a2, BW(A2), b2, BW(B2)) and (a3, BW(A3), b3, BW(B3)). Here, a2 is location information of the uplink dedicated component carrier A2, BW(A2) is bandwidth information of the uplink dedicated component carrier A2, b2 is location information of a downlink shared dedicated component carrier B2, and BW(B2) is bandwidth information of the downlink dedicated component carrier B2. In the same manner, a3 is location information of the uplink dedicated component carrier A3, BW(A3) is bandwidth information of the uplink dedicated component carrier A3, b3 is location information of a downlink dedicated component carrier B3, and BW(B3) is bandwidth information of the downlink dedicated component carrier B3.

Figure 7:
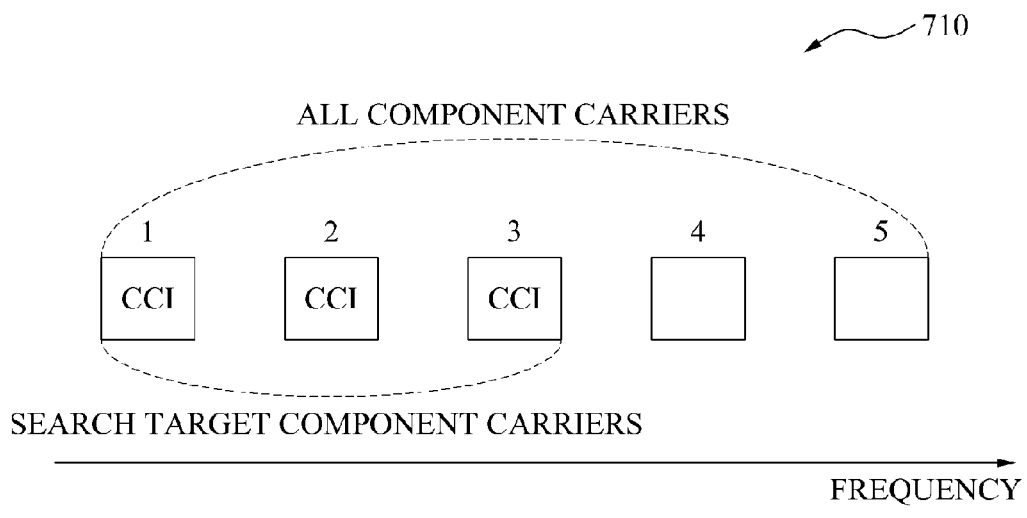
FIG. 7 illustrates examples of embodying a component carrier indicator.
Figure 7:
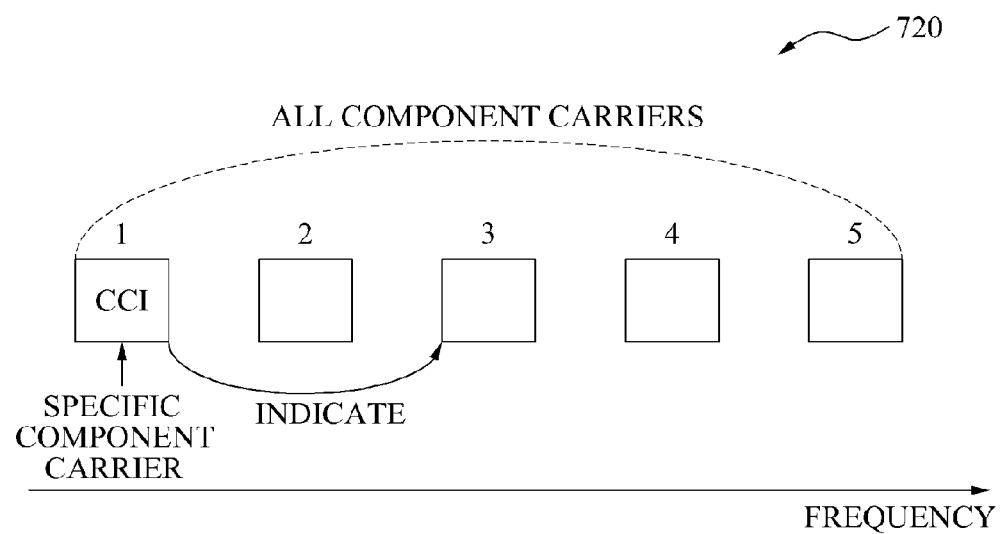

FIG. 7 illustrates examples of embodying a component carrier indicator.

Prior to describing the component carrier indicator of the present invention with respect to FIG. 7, several conditions will be described. A type 2 base station transmits, to each of downlink component carriers, downlink assignment information including a modulation scheme of physical data, information about assigned resource, and the like. Also, the type 2 base station may transmit uplink assignment information. The type 2 terminal may receive physical data in a downlink by using the downlink assignment information, and may also transmit physical data in an uplink by using the uplink assignment information. The downlink assignment information and the uplink assignment information is referred to as resource assignment information.

Unlike type 1 terminals that use a single downlink component carrier and a single uplink component carrier, type 2 terminals may use at least one downlink component carrier and at least one uplink component carrier. In this instance, a number of downlink component carriers used by the type 2 terminals and a number of uplink component carriers used by the type 2 terminals may be different. Also, the number of downlink component carriers or the number of the uplink component carriers used by the type 2 terminal may be different for each of the type 2 terminals according to a User Equipment (UE) capability of the type 2 terminals.

The downlink assignment information or the uplink assignment information is transmitted to each of terminals, and a base station using carrier aggregation transmits the downlink assignment information or the uplink assignment information through each of downlink component carriers. The downlink assignment information includes information about a transmission scheme of downlink physical data in a downlink component carrier through which the downlink assignment information is transmitted. A terminal may search for the downlink assignment information by individually performing blind-decoding of each of the downlink component carriers, and may decode downlink physical data transmitted to the terminal from the base station by using the downlink assignment information. Also, the uplink assignment information includes information about a transmission scheme of uplink physical data in an uplink component carrier corresponding to a downlink component carrier through which the uplink assignment information is transmitted. The terminal may perform blind-decoding with respect to each of the downlink component carriers to search for the uplink assignment information, and the uplink physical data may be transmitted to the base station through the uplink component carrier corresponding to the downlink component carrier through which the uplink assignment information is transmitted, by using the uplink assignment information.

The type 2 base station may perform transmission of the downlink assignment information or the uplink assignment information via a downlink component carrier or via a number of downlink component carriers. The type 2 terminal may be unaware of a downlink component that the type 2 base station uses for transmitting the downlink assignment information or the uplink assignment information among the downlink component carriers, and thus, the type 2 terminal may perform blind-decoding with respect to all the downlink component carriers to search for the downlink assignment information or the uplink assignment information. When the type 2 terminal needs to perform blind-decoding with respect to all the downlink component carriers in each sub-frame, power consumption increases, thereby increasing ineffectiveness.

The present invention may reduce power consumption of the type 2 terminal by only performing blind-decoding with respect to predetermined downlink component carriers by using the component carrier indicator. Here, the component carrier indicator may include a semi-static component carrier indicator, a dynamic component carrier indicator, and a combination of the semi-static component carrier indicator and the dynamic component carrier indicator.

A Semi-Static Component Carrier Indicator

A graph 710 of FIG. 7 indicates that the type 2 base station transmits a semi-static component carrier indicator to the type 2 terminals. The type 2 base station may decrease a number of component carriers to be retrieved by the type 2 terminal through the semi-static component carrier indicator. Here, the semi-static component carrier indicator indicates component carriers that the type 2 base station and the type 2 terminals intend to use, and the semi-static component carrier may be generated according to a bit-map scheme.

The type 2 base station may transmit the semi-static component carrier indicator based on a cell unit, or may transmit the semi-static component carrier indicator to each of the type 2 terminals based on a user unit. Transmission of the semi-static component carrier indicator based on the cell unit indicates transmission of an identical semi-static component carrier indicator to all the type 2 terminals, and transmission of the semi-static component carrier indictor based on the user unit indicates individual transmission of the semi-static component carrier indicator to each of the type 2 terminals. As an example, when a semi-static component carrier indicator (1, 1, 1, 0, 0) based on the bit-map scheme is transmitted based on the cell unit, all type 2 terminals may only search for component carriers 1, 2, and 3 among component carriers 1 to 5. Also, in the same manner as the type 2 base station transmits a semi-static component carrier indicator (1, 0, 0, 0, 0) to a terminal A, and transmits a semi-static component (1, 1, 0, 0, 0) to a terminal B, the type 2 base station may transmit semi-static component carrier indicator based on the user unit. In this instance, the terminal A may search for the component carrier 1 and the terminal B may search for the component carriers 1 and 2.

Here, the type 2 base station transmits the semi-static component carrier indicator based on various methods. The methods may include a method of transmitting based on a cell unit, a method of transmitting based on a user unit, and a method of transmitting based on a combination of the two methods.

Also, the semi-static component carrier indicator may be transmitted through an upper layer signaling, such as a radio resource control (RRC) signaling.

The type 2 base station may transmit system information including the semi-static component carrier indicator to all type 2 terminals in a cell based on the cell unit. In this instance, each of the type 2 terminals may not need to search for all component carriers to find out its own uplink assignment information and downlink assignment information. That is, each of the type 2 terminals may identify search target component carriers through the semi-static component carrier indicator. As described above, search target component carriers indicated by the semi-static component carrier indicator are carriers 1, 2, and 3 among the components 1 to 5 in the graph 710. Accordingly, each of the type 2 terminals receives the semi-static component carrier indicator, thereby decreasing a number of component carriers to be retrieved. Also, each of the type 2 terminals only searches for the search target component carriers indicated by the semi-static component carrier indicator, thereby easily ascertaining its own uplink assignment information and the downlink assignment information.

Also, the type 2 base station may transmit the semi-static component carrier indicator individually to each of the type 2 terminals through signaling dedicated to terminals. In the same manner, each of the type 2 terminals may identify the search target component carriers indicated by the semi-static component carrier indicator, and may only search for the search target component carriers, thereby promptly ascertaining its own uplink assignment information and the downlink assignment information with only a small amount of power consumption.

Dynamic Component Carrier Indicator

The type 2 base station performs transmission/reception of a signal with the type 2 terminal by using a plurality of downlink component carriers. The type 2 base station may designate at least one assignment downlink component carrier among the plurality of downlink component carriers.

Downlink assignment information or uplink assignment information may be transmitted through an assignment downlink component carrier, and the downlink assignment information or uplink assignment information may not be transmitted through other downlink component carriers excluding the assignment downlink component carrier. Here, assignment downlink component carrier designation information may be generated according to a bit-map scheme, the assignment downlink component carrier designation information indicating which downlink component carrier is the assignment downlink component carrier.

As an example, when the assignment downlink component carrier designation information is (0, 0, 1, 0, 0), the component carrier 3 of the component carrier 1 to 5 is the assignment downlink component carrier, and when the assignment downlink component carrier designation information is (1, 0, 1, 0, 0), the component carriers 1 and 3 of the component carriers 1 to 5 are assignment downlink component carriers.

Here, the type 2 base station transmits, to the type 2 terminal, the assignment downlink component carrier designation information based on various methods. The methods may include a method of transmitting based on a cell unit, a method of transmitting based on a user unit, and a method of transmitting based on a combination of the two methods. According to the method of transmitting based on the cell unit, the type 2 base station may transmit identical assignment downlink component carrier designation information to all the type 2 terminals in a cell. Conversely, according to the method of transmitting based on the user unit, the type 2 base station may individually transmit assignment downlink component carrier designation information to each of the type 2 terminals, and the assignment downlink component carrier designation information transmitted to each of the type 2 terminals may be different from each other.

The type 2 base station may transmit the downlink assignment information or the uplink assignment information only through at least one predetermined assignment component carrier. In this instance, the dynamic component carrier indicator may also be transmitted together with the downlink assignment information or the uplink assignment information.

The downlink assignment information includes information indicating a downlink physical data transmission scheme of a downlink component carrier through which the downlink assignment information is transmitted, and thus, the downlink assignment information may not indicate a downlink physical data transmission scheme of other downlink component carriers excluding the downlink component carrier through which the downlink assignment information is transmitted. In the same manner, the uplink assignment information includes information indicating an uplink physical data transmission scheme of an uplink component carrier corresponding to a downlink component carrier through which the uplink assignment information is transmitted, and thus, the uplink assignment information may not indicate an uplink physical data transmission scheme of uplink component carriers corresponding to other downlink component carriers excluding the downlink component carrier through which the uplink assignment information is transmitted.

Basically, when the assignment downlink component carrier is designated, the downlink assignment information may only indicate a downlink physical data transmission scheme with respect to the assignment downlink component carrier. Also, basically, the uplink assignment information may only indicate an uplink physical data transmission scheme with respect to the uplink component carrier corresponding to the assignment downlink component carrier, and may not indicate other downlink component carriers or other uplink component carriers.

The present invention proposes to transmit conventional downlink assignment information including the dynamic component carrier indicator. Also, the present invention proposes to transmit conventional uplink assignment information including the dynamic component carrier indicator. Here, the dynamic component carrier indicator is information indicating a downlink component carrier related to the downlink assignment information including the dynamic component carrier indicator or information indicating an uplink component carrier related to the uplink assignment information including the dynamic component carrier indicator.

In this instance, the type 2 terminals may extract the dynamic component carrier indicator and downlink assignment information or may extract the uplink assignment information, by only searching for assignment component carriers. Here, the dynamic component carrier indicator may indicate a component carrier corresponding to the uplink assignment information identified by the assignment component carrier or a component carrier corresponding to the downlink assignment information identified by the assignment component carrier. That is, the type 2 terminals may identify the uplink assignment information or the downlink assignment information and the dynamic component carrier indicator, by only searching for assignment component carriers, and the type 2 terminals may identify a component carrier corresponding to the uplink assignment information or a component carrier corresponding to the downlink assignment information based on the dynamic component carrier indicator.

As an example, referring to a graph 720, the type 2 terminals may identify the dynamic component carrier indicator, the uplink assignment information, and downlink assignment information by only searching for the component carrier 1. Also, the type 2 terminals may identify that the uplink assignment information and the downlink assignment information correspond to the component carrier 3, after identifying that the component carrier indicator indicates the component carrier 3.

Also, the semi-static component carrier indicator and the dynamic component carrier indicator may be used individually or together by the type 2 base station.

The operational methods of the base station and the terminal according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although it is not illustrated in FIGS. 1 through 7, a technical concept disclosed in the present invention may be embodied in a form of hardware. Particularly, a base station of a communication system that uses carrier aggregation may include a shared component carrier designation unit to designate a frequency bandwidth that is used for a type 1 terminal and a type 2 terminal as a downlink shared component carrier and an uplink shared component carrier, a dedicated component carrier designation unit to designate at least one frequency bandwidth that is used for the type 2 terminal as at least one downlink dedicated component carrier and at least one uplink dedicated component carrier, a broadcast information transmitting unit to transmit the shared broadcast information for the type 1 terminal and the type 2 terminal and the dedicated broadcast information for the type 2 terminal, by using the at least one downlink shared component carrier, and a component carrier indicator transmitting unit to transmit a component carrier indicator for indicating component carriers that are used by the type 2 terminal and the base station.

The description disclosed above may be applicable to each configuration components included in the base station, and thus, a detailed description thereof will be omitted.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An operational method for a base station of a communication system that uses carrier aggregation, the method comprising:
    designating a frequency hand that is used for a type 1 terminal and a type 2 terminal as at least one downlink shared component carrier and at least one uplink shared component carrier; and
    designating at least one frequency band that is used for the type 2 terminal as at least one downlink dedicated component carrier and at least one uplink dedicated component carrier.

2. The method of claim 1, wherein the at least one downlink shared component carrier and the at least one uplink shared component carrier are used for transmitting/receiving a control signal, a reference signal, and physical data corresponding to the type 1 terminal and the type 2 terminal, and the at least one downlink dedicated component carrier and the at least one uplink dedicated component carrier are used for transmitting/receiving a control signal, a reference signal, and physical data corresponding to the type 2 terminal.

3. The method of claim 1, wherein the at least one downlink shared component carrier and the at least one uplink shared component carrier are mapped together according to a mapping function, and the at least one downlink dedicated component carrier and the at least one uplink dedicated component carrier are mapped together according to the mapping function.

4. The method of claim 1, further comprising:
    assigning indexes to the at least one downlink shared component carrier, the at least one uplink shared component carrier, the at least one downlink dedicated component carrier, and the at least one uplink dedicated component carrier, wherein the indexes are used by the type 1 terminal and the type 2 terminal for identifying either a mapping relation between the at least one downlink shared component carrier and the at least one uplink shared carrier or a mapping relation between the at least one downlink dedicated component carrier and the at least one uplink dedicated component carrier.

5. The method of claim 1, further comprising:
adaptively selecting at least one of the at least one downlink shared component carrier, the at least one uplink shared component carrier, the at least one downlink dedicated component carrier, and the at least one uplink dedicated component carrier; and
using the selected at least one carrier for the type 2 terminal.

6. The method of claim 1, further comprising:
transmitting broadcast information by using the at least one downlink shared component carrier.

7. The method of claim 6, wherein the broadcast information includes shared broadcast information for the type 1 terminal and the type 2 terminal, and the broadcast information includes dedicated broadcast information for the type 2 terminal.

8. The method of claim 7, wherein each of the shared broadcast information and the dedicated broadcast information is identified according to a unique identifier, and the unique identifier is masked on a cyclic redundancy check (CRC) code of information indicating the broadcast information.

9. The method of claim 7, wherein:
the shared broadcast information includes information related to the at least one downlink shared component carrier and the at least one uplink shared component carrier; and
the dedicated broadcast information includes information related to the at least one downlink shared component carrier, the at least one uplink shared component carrier, the at least one downlink dedicated component carrier, and the at least one uplink dedicated component carrier.

10. The method of claim 9, wherein:
the information related to the at least one downlink shared component carrier and the at least one uplink shared component carrier includes information related to bandwidths and locations of the at least one downlink shared component carrier and the at least one uplink shared component carrier, and the information related to the at least one downlink shared component carrier, the at least one uplink shared component carrier, the at least one downlink dedicated component carrier, and the at least one uplink dedicated component carrier includes bandwidths and locations of the at least one downlink shared component carrier, the at least one uplink shared component carrier, the at least one downlink dedicated component carrier, and the at least one uplink dedicated component carrier.

11. The method of claim 7, wherein the shared broadcast information includes either a pair of information related to the at least one downlink shared component carrier and information related to the at least one uplink shared component carrier or a pair of information related to the at least one downlink dedicated component carrier and information related to the at least one uplink dedicated component carrier.

12. The method of claim 1, further comprising:
transmitting at least one of a semi-static component carrier indicator and a dynamic component carrier indicator for indicating component carriers that are used by the base station and the type 2 terminal.

13. The method of claim 12, wherein the type 2 terminal searches for a predetermined number of component carriers indicated by the semi-static component carrier indicator and identifies corresponding resource assignment information.

14. The method of claim 12, wherein the type 2 terminal searches for at least one predetermined assignment component carrier, identifies the dynamic component carrier indicator, and identifies a component carrier related to corresponding resource assignment information based on the identified dynamic component carrier indicator.

15. The method of claim 14, wherein the at least one predetermined assignment component carrier is known to the type 2 terminal through assignment information downlink component carrier designation information.

16. A base station of a communication system that uses carrier aggregation, the base station comprising:
a shared component carrier designation unit to designate a frequency bandwidth that is used for a type 1 terminal and a type 2 terminal as at least one downlink shared component carrier and at least one uplink shared component carrier;
a dedicated component carrier designation unit to designate at least one frequency bandwidth that is used for the type 2 terminal as at least one downlink dedicated component carrier and at least one uplink dedicated component carrier;
a broadcast information transmitting unit to transmit the shared broadcast information for the type 1 terminal and the type 2 terminal and the dedicated broadcast information for the type 2 terminal, by using the at least one downlink shared component carrier; and
a component carrier indicator transmitting unit to transmit a dynamic component carrier indicator or a semi-static component carrier indicator for indicating component carriers that are used by the type 2 terminal and the base station.

17. The base station of claim 16, wherein the semi-static component carrier indicator indicates a predetermined number of component carriers which are required to be retrieved to identify resource assignment information corresponding to the type 2 terminal.

18. The base station of claim 16, wherein the dynamic component carrier indicator indicates a component carrier related to the corresponding resource assignment information identified by the type 2 terminal.

19. An operational method of a type 2 terminal of a communication system that uses carrier aggregation, the method comprising:
receiving broadcast information transmitted through at least one downlink shared component carrier, the broadcast information including shared broadcast information for a type 1 terminal and a type 2 terminal and dedicated broadcast information for the type 2 terminal;
extracting each of the shared broadcast information and the dedicated broadcast information according to unique identifier; and
receiving a dynamic component carrier identifier or a semi-static component carrier identifier for identifying component carriers that are used by a base station and the type 2 terminal,
wherein a frequency bandwidth that is used for the type 1 terminal and the type 2 terminal is designated as at least one downlink shared component carrier and at least one uplink shared component carrier, and at least one frequency bandwidth that is used for the type 2 terminal is designated as at least one downlink dedicated component carrier and at least one uplink dedicated component carrier.

20. The method of claim 19, further comprising:
at least one of searching for a predetermined number of component carriers based on a component carrier indicator to identify corresponding resource assignment information; and searching for a predetermined assignment component carrier to identify the component carrier indicator and identifying the corresponding resource assignment information based on the identified component carrier indicator.

21. An operational method for a base station that supports carrier aggregation, the method comprising:
    assigning a first component carrier for a type 1 terminal that does not support the carrier aggregation and a type 2 terminal that supports the carrier aggregation;
    assigning at least one second component carrier different from the first component carrier for the type 2 terminal;
    assigning index to the at least one second component carrier;
    transmitting, to the type 2 terminal, information related to location of the at least one second component carrier, information related to bandwidth of the at least one second component carrier, and information related to the index of the at least one second component carrier, and
    transmitting data to the type 2 terminal through the at least one second component carrier.

22. An operational method for a terminal that supports carrier aggregation, the method comprising:
    receiving assignment for a first component carrier from a base station supporting both a type 1 terminal that does not support the carrier aggregation and a type 2 terminal that supports the carrier aggregation;
    receiving assignment for at least one second component carrier different from the first component carrier from the base station; and
    receiving data from the base station through the at least one second component carrier,
    wherein the receiving assignment for the at least one second component carrier comprises receiving, from the base station, information related to index assigned to the at least one second component carrier, information related to location of the at least one second component carrier, and information related to bandwidth of the at least one second component carrier.

* * * * *